US011197061B2

(12) United States Patent
Zavesky et al.

(10) Patent No.: US 11,197,061 B2

(45) Date of Patent: *Dec. 7, 2021

(54) ADVERTISEMENT GENERATION BASED ON A USER IMAGE

(71) Applicant: AT&T Intellectual Property I, L.P., Atlanta, GA (US)

(72) Inventors: Eric Zavesky, Austin, TX (US); David Crawford Gibbon, Lincroft, NJ (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,024

(22) Filed: Sep. 14, 2020

(65) Prior Publication Data

US 2020/0413137 A1 Dec. 31, 2020

Related U.S. Application Data

(63) Continuation of application No. 16/016,849, filed on Jun. 25, 2018, now Pat. No. 10,805,678, which is a (Continued)

(51) Int. Cl.

*H04N 21/442* (2011.01)
*H04N 21/81* (2011.01)
(Continued)

(52) U.S. Cl.

CPC ....... *H04N 21/44218* (2013.01); *G06Q 30/02* (2013.01); *H04N 21/4223* (2013.01); (Continued)

(58) Field of Classification Search

None

See application file for complete search history.

(56) References Cited

U.S. PATENT DOCUMENTS 7,103,368 B2 9/2006 Teshima
8,126,774 B2 2/2012 Hendrickson et al.
(Continued)

OTHER PUBLICATIONS

Chen, Peng-Ting , "Personalized Mobile Advertising: Its Key Attributes, Trends, and Social Impact", Technological Forecasting and Social Change vol. 79, Issue 3, Mar. 2012, 2 pages.
(Continued)

*Primary Examiner* — James R Marandi

(74) *Attorney, Agent, or Firm* — Guntin & Gust, PLC; Dana Lemoine

(57) ABSTRACT

A method includes receiving, at a computing device, first image data of a viewer of an output of user equipment. The method includes selecting, at the computing device based on a first item identified in the first image data, a background component to be included in multimedia content. The method also includes providing, from the computing device, the multimedia content to the user equipment for presentation to the viewer. The multimedia content includes the background component and a first foreground component, where the first foreground component has a first characteristic.

20 Claims, 6 Drawing Sheets

Related U.S. Application Data continuation of application No. 14/674,966, filed on Mar. 31, 2015, now Pat. No. 10,034,050.

(51) Int. Cl.
*H04N 21/4223* (2011.01)
*H04N 21/45* (2011.01)
*G06Q 30/02* (2012.01)
*H04N 21/475* (2011.01)
*H04H 60/46* (2008.01)

(52) U.S. Cl.
CPC ..... *H04N 21/4532* (2013.01); *H04N 21/4756* (2013.01); *H04N 21/812* (2013.01); *H04N 21/8153* (2013.01); *G06Q 30/0271* (2013.01); *G06Q 30/0276* (2013.01); *H04H 60/46* (2013.01)

(56) References Cited

U.S. PATENT DOCUMENTS 8,280,771 B2 10/2012 Hendrickson et al.
8,650,265 B2 2/2014 Broder et al.
8,726,312 B1 5/2014 Hewinson et al.
8,838,748 B2 9/2014 Nair et al.
9,451,087 B2 9/2016 Fagundes et al.
2007/0050253 A1 3/2007 Biggs et al.
2007/0279494 A1 12/2007 Aman et al.
2008/0019576 A1 1/2008 Senftner et al.
2009/0037279 A1 2/2009 Chockalingam et al.
2009/0187483 A1 7/2009 You et al.
2010/0121690 A1 5/2010 Lee et al.
2010/0137053 A1 6/2010 Blair et al.
2010/0289912 A1 11/2010 Katz et al.
2010/0332313 A1* 12/2010 Miller ................ G06Q 30/0257 705/14.44
2011/0264656 A1 10/2011 Dumais et al.
2012/0011454 A1 1/2012 Droz et al.
2012/0123830 A1 5/2012 Svendsen et al.
2012/0253937 A1 10/2012 Wing et al.
2013/0006866 A1 1/2013 Pendakur et al.
2013/0097014 A1 4/2013 Martin et al.
2013/0110642 A1 5/2013 Lee et al.
2013/0325613 A1 12/2013 Pham
2014/0032302 A1 1/2014 Li et al.
2014/0108145 A1 4/2014 Patel et al.
2014/0114760 A1 4/2014 Reinshagen
2014/0195345 A1 7/2014 Lyren et al.
2014/0298363 A1 10/2014 Begeja et al.
2014/0337089 A1 11/2014 Tavares
2015/0020086 A1 1/2015 Chen et al.

OTHER PUBLICATIONS

Evans, C. et al., "An Intelligent Mobile Advertising System (iMAS): Location-Based Advertising to Individuals and Business", Complex, Intelligent and Software Intensive Systems (CISIS); Sixth International Conference on IEEE, Jul. 2012, 2 pages.

Xu, David J. et al., "Combining Empirical Experimentation and Modeling Techniques: A Design Research Approach for Personalized Mobile Advertising Applications", Science Direct, Decision Support Systems 44(2008); www.sciencedirect.com, 2008, 15 pages.

* cited by examiner

ADVERTISEMENT GENERATION BASED ON A USER IMAGE

PRIORITY CLAIM

This application is a continuation of U.S. patent application Ser. No. 16/016,849 filed Jun. 25, 2018, which is a continuation of U.S. patent application Ser. No. 14/674,966 (now U.S. Pat. No. 10,034,050) filed Mar. 31, 2015. The contents of each of the foregoing are hereby incorporated by reference into this application as if set forth herein in full.

FIELD OF THE DISCLOSURE

The present disclosure is generally related to generating an advertisement based on a user image.

BACKGROUND

Targeted advertisements are considered more effective in generating sales. Separate advertisements of a particular product may be generated for various markets. For example, a first advertisement for the particular product (e.g., cookies) may target adults. A second advertisement for the particular product may target children. Producing multiple advertisements for a single product may be expensive. Each advertisement may be targeted to a large portion of the market. For example, the advertisement may not be targeted to a single individual.

BRIEF DESCRIPTION OF THE DRAWINGS

Reference will now be made to the accompanying drawings, which are not necessarily drawn to scale, and wherein.

DETAILED DESCRIPTION

Figure 1:
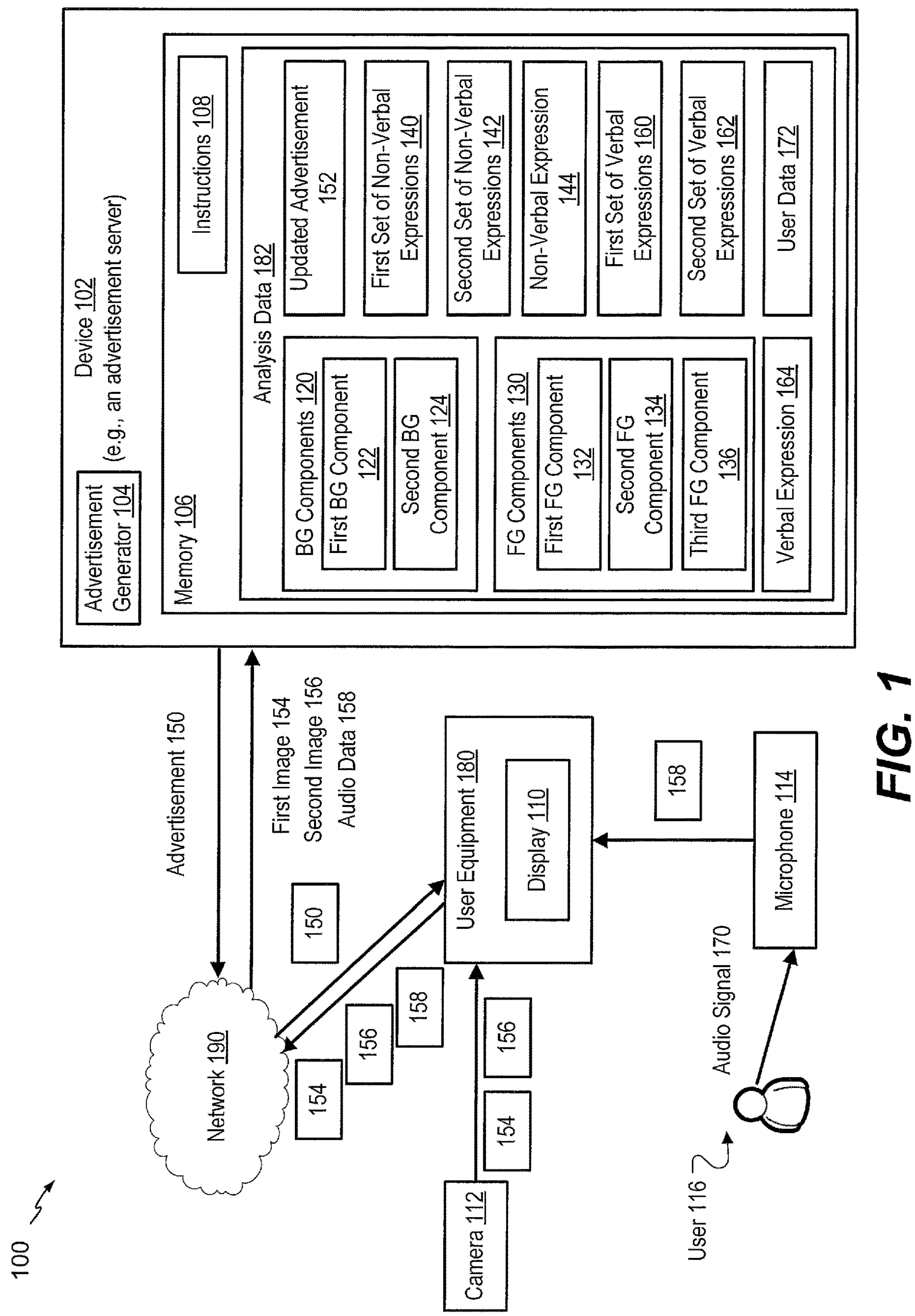
FIG. 1 is a diagram of a particular illustrative embodiment of a system that generates an advertisement based on a user image.

Systems and methods of advertisement generation based on a user image are disclosed. An advertisement generator may have access to a plurality of background components and a plurality of foreground components that are combinable to form advertisements. The advertisement generator may receive a first image of a user. The advertisement generator may select a particular background component from the plurality of background components based on the first image. For example, the user in the first image may be wearing a type of clothing (e.g., sleep wear, a business suit, a swim suit, a track suit, etc.), may be wearing (or carrying) a type of accessory (e.g., a brief case, a beach ball, running shoes, etc.), or a combination thereof. The particular background component may depict a particular location (e.g., a home, an office, a beach, a hiking trail, etc.). The advertisement generator may select the particular background component based on the particular location corresponding to the type of clothing, the type of accessory, or both, indicated in the first image.

The advertisement generator may generate a first advertisement by combining the particular background component and a first foreground component of the plurality of foreground components. In a particular example, the advertisement generator may select the first foreground component based on user data (e.g., user demographics, user preferences, content history, purchase history, or a combination thereof). The advertisement generator may provide the first advertisement, via a display interface, to a display device.

The advertisement generator may receive a second image of a user. The second image may indicate a user response to the first advertisement. The advertisement generator may also receive audio data associated with the user response. For example, the advertisement generator may determine that the second image, the audio data, or both, are associated with the user response in response to determining that the second image, the audio data, or both, are received shortly after (e.g., within a threshold duration of) providing the first advertisement to the display device.

The advertisement generator may determine whether the user response to the first advertisement is positive or negative based on the second image, the audio data, or both. For example, the advertisement generator may determine a facial expression of the user by using image detection techniques to analyze the second image. The advertisement generator may determine that the user response is positive in response to determining that the facial expression is included in a set of positive facial expressions (e.g., smiling). As another example, the advertisement generator may detect a verbal expression by using speech recognition techniques to analyze the second image. The advertisement generator may determine that the user response is positive in response to determining that the verbal expression is included in a set of positive verbal expressions (e.g., "nice"). The advertisement generator may determine that the user response to the first advertisement is positive in response to determining that both the facial expression and the verbal expression indicate that the user response is positive. In a particular example, the advertisement generator may determine that the user response to the first advertisement is negative in response to determining that at least one of the facial expression or verbal expression indicates that the user response is negative.

The advertisement generator may select a second foreground component based on the user response. For example, the first foreground component and the second foreground component may share a common characteristic (e.g., a type of clothing item, a color of the clothing time, a type of accessory, or a color of the accessory). The advertisement generator may select the second foreground component in response to determining that the user response to the first advertisement is positive. As another example, the first foreground component may include a first characteristic, and the second foreground component may include a second characteristic that is distinct from the first characteristic. The advertisement generator may select the second foreground component in response to determining that the user response to the advertisement is negative. The advertisement generator may generate a second advertisement by combining the particular background component and the second foreground component. The advertisement generator may provide the second advertisement, via the display interface, to the display device.

In a particular embodiment, a method includes receiving an image of a user. The image indicates a user response to an advertisement. The advertisement includes a background component and a first foreground component. The method also includes selecting a second foreground component based on the user response. The method further includes generating an updated advertisement by combining the background component and the second foreground component.

In another particular embodiment, a device includes a processor and a memory. The memory is configured to store a plurality of background components and a plurality of foreground components. The plurality of background components and the plurality of foreground components are combinable to form advertisements. The processor is configured to select a first background component of the plurality of background components based on a first image of a user. The processor is also configured to generate an advertisement by combining the first background component and a first foreground component of the plurality of foreground components.

In another particular embodiment, a computer-readable storage device stores instructions that, when executed by a processor, cause the processor to perform operations including receiving an image of a user. The image indicates a user response to an advertisement. The advertisement includes a background component and a first foreground component. The operations also include selecting a second foreground component based on the user response. The operations further include generating an updated advertisement by combining the background component and the second foreground component.

Referring to FIG. 1, a particular illustrative embodiment of a system is disclosed and generally designated 100. The system 100 includes a device 102 (e.g., an advertisement server). The device 102 may be coupled, via a network 190, to user equipment 180 (e.g., a mobile device). The device 102 includes an advertisement generator 104 coupled to a memory 106. The memory 106 may include processor-executable instructions 108. The memory 106 may include analysis data 182. The analysis data 182 may include background (BG) components 120 and foreground (FG) components 130. A particular BG component may include an image, a video, or both, of a particular location. The BG components 120 may include a first BG component 122, a second BG component 124, one or more additional BG components, or a combination thereof. The first BG component 122 may depict a first location (e.g., a home, an office, a beach, a hiking trail, etc.). The second BG component 124 may depict a second location.

The FG components 130 may include a first FG component 132, a second FG component 134, a third FG component 136, one or more additional FG components, or a combination thereof. A particular FG component may include an image, a video, text, or a combination thereof. For example, the particular FG component may include an image of an advertised item (e.g., an accessory, a clothing item, or both), a video of the advertised item, or a combination thereof. The first FG component 132 may have a first characteristic. For example, the first FG component 132 may represent a first type of clothing item, a first clothing color of the clothing item, a first type of accessory, a first accessory color of the accessory, or a combination thereof. To illustrate, the first FG component 132 may represent one or more people wearing various clothing items and using various accessories. The first FG component 132 and the second FG component 134 may have a common characteristic. For example, the second FG component 134 may have a second characteristic that is the same as the first characteristic. The third FG component 136 may have a particular characteristic that is distinct from the first characteristic. For example, the third FG component 136 may represent a second type of clothing item, a second clothing color of the clothing item, a second type of accessory, a second accessory color of the accessory, or a combination thereof. The BG components 120 may be combinable with the FG components 130 to form advertisements.

The analysis data 182 may include a first set of facial expressions 140 (e.g., data indicating facial expressions that indicate a positive user response), a second set of facial expressions 142 (e.g., data indicating facial expressions that indicate a negative user response), a first set of verbal expressions 160 (e.g., data indicating verbal expressions that indicate a positive user response), a second set of verbal expressions 162 (e.g., data indicating verbal expressions that indicate a negative user response), or a combination thereof. The analysis data 182 may include user data 172 indicating user preferences, content history, purchase history, user demographics, or a combination thereof, corresponding to a user (e.g., the user 116) of the user equipment 180.

The user equipment 180 may include, or be coupled to, a display 110, an image sensor (e.g., a camera 112), a sound sensor (e.g., a microphone 114), or a combination thereof. In a particular embodiment, one or more components of the system 100 may be combined. For example, the user equipment 180 may include the advertisement generator 104, the memory 106, or both.

During operation, the device 102 may receive a first image 154 of a user 116. For example, the camera 112 may capture the first image 154 and may provide the first image 154 to the user equipment 180. The user equipment 180 may send the first image 154, via the network 190, to the device 102. The advertisement generator 104 may use image recognition techniques to determine that the first image 154 represents a type of clothing item (e.g., sleep wear, a business suit, a swim suit, a track suit, etc.), a type of accessory (e.g., a brief case, a beach ball, running shoes, etc.), or both. The advertisement generator 104 may select the first BG component 122 in response to determining that the first BG component 122 corresponds to the first location, and that the first location (e.g., a hiking trail) corresponds to the type of clothing item (e.g., a track suit), the type of accessory (e.g., running shoes), or both. In a particular embodiment, data associated with the first BG component 122 may indicate the first location. In an alternate embodiment, the advertisement generator 104 may use image recognition techniques to determine that the first BG component 122 corresponds to the first location.

The advertisement generator 104 may select the first BG component 122 from the BG components 120 based on the first image 154. For example, the advertisement generator 104 may have access to mapping data that indicates that the type of clothing item, the type of accessory, or both, correspond to the first location. The advertisement generator 104 may determine that the type of clothing item, the type of accessory, or both, correspond to the first location based on the mapping data. The first location may be similar to locations that the user 116 frequents because the first location is selected based on the first image 154. The advertisement generator 104 may select the first BG component 122 in response to determining that the first BG component 122 corresponds to the first location.

The advertisement generator 104 may select the first FG component 132 based on the user data 172 (e.g., user preferences, content history, purchase history, user demographics, or a combination thereof). For example, the advertisement generator 104 may use facial recognition techniques to identify the user 116 based on the first image 154. The advertisement generator 104 may determine that the user data 172 corresponds to the identified user (e.g., the user 116) and may select the first FG component 132 based on the user data 172. In a particular embodiment, the advertisement generator 104 may select the first FG component 132 in response to determining that the first FG component 132 is a next FG component to be processed.

The advertisement generator 104 may generate an advertisement 150 by combining the first BG component 122 and the first FG component 132. In a particular embodiment, the advertisement 150 may include additional components. For example, the first BG component 122 may correspond to a background location, another component may correspond to an image of a first person (e.g., the user 116), and the first FG component 132 may represent a particular clothing item (e.g., a shirt) corresponding to the image of the first person. To illustrate, a first display location of the first FG component 132 relative to a second display location of the image of the first person may be such that the first person appears to be wearing the particular clothing item when the advertisement 150 is displayed. The advertisement 150 may include one more additional FG components representing other clothing items, accessories, or a combination thereof, corresponding to image of the first person. The advertisement 150 may include components corresponding to images of one or more additional people (or animals), clothing items corresponding to the images of the one or more additional people (or animals), accessories corresponding to the images of the one or more additional people (or animals), or a combination thereof. The advertisement generator 104 may send the advertisement 150, via the network 190, to the user equipment 180. For example, the advertisement generator 104 may provide the advertisement 150, via a network interface, to the network 190.

The user equipment 180 may provide the advertisement 150, via a display interface, to the display 110. The user 116 may be receptive to the advertisement 150 because the first items are represented in the first location that may be similar to locations frequented by the user 116. The camera 112 may, at a first time, capture the second image 156 of the user 116. The first time may be shortly after (e.g., within a threshold duration of) the advertisement 150 being provided to the display 110. For example, the display 110 may be displaying the advertisement 150 at the first time. The camera 112 may provide the second image 156 to the user equipment 180. The microphone 114 may, at approximately the first time, capture an audio signal 170. The microphone 114 may provide audio data 158 corresponding to the audio signal 170 to the user equipment 180. The second image 156, the audio data 158, or both, may indicate a user response of the user 116 to the advertisement 150. For example, the second image 156 may represent a facial expression 144, a verbal expression 164, or both, of the user 116. To illustrate, the user 116 may smile or say something when the advertisement 150 is being displayed by the display 110.

The advertisement generator 104 may receive the second image 156, the audio data 158, or both, via the network 190, from the user equipment 180. The advertisement generator 104 may determine the facial expression 144 (e.g., smiling, interested, neutral, bored, or irritated) by performing image recognition on the second image 156. The advertisement generator 104 may store the facial expression 144 (e.g., data indicating the facial expression 144) in the memory 106. The advertisement generator 104 may determine the verbal expression 164 (e.g., “nice”, “good”, “hmm”, or “yuck”) by performing speech recognition on the audio data 158. The advertisement generator 104 may store the verbal expression 164 (e.g., data indicating the verbal expression 164) in the memory 106.

The advertisement generator 104 may determine whether the facial expression 144 indicates that the user response is positive, negative, or neutral. For example, the first set of facial expressions 140 may correspond to positive facial expressions (e.g., smiling and interested). The advertisement generator 104 may determine that the facial expression 144 indicates that the user response is positive in response to determining that the first set of facial expressions 140 includes the facial expression 144. As another example, the second set of facial expressions 142 may correspond to negative facial expressions (e.g., bored and irritated). The advertisement generator 104 may determine that the facial expression 144 indicates that the user response is negative in response to determining that the second set of facial expressions 142 includes the facial expression 144. As a further example, the advertisement generator 104 may determine that the facial expression 144 indicates that the user response is neutral in response to determining that a particular set of facial expressions (e.g., neutral) includes the facial expression 144.

The advertisement generator 104 may determine whether the verbal expression 164 indicates that the user response is positive, negative, or neutral. For example, the first set of verbal expressions 160 may correspond to positive verbal expressions (e.g., “nice” and “good”). The advertisement generator 104 may determine that the verbal expression 164 indicates that the user response is positive in response to determining that the first set of verbal expressions 160 includes the verbal expression 164. As another example, the second set of verbal expressions 162 may correspond to negative verbal expressions (e.g., “yuck”). The advertisement generator 104 may determine that the verbal expression 164 indicates that the user response is negative in response to determining that the second set of verbal expressions 162 includes the verbal expression 164. As a further example, the advertisement generator 104 may determine that the verbal expression 164 indicates that the user response is neutral in response to determining that a particular set of verbal expressions (e.g., “hmm”) includes the verbal expression 164. The advertisement generator 104 may determine whether the user response is positive, negative, or neutral based on the facial expression 144, the verbal expression 164, or both. For example, the advertisement generator 104 may determine that the user response is positive in response to determining that the facial expression 144, the verbal expression 164, or both, indicate that the user response is positive. As another example, the advertisement generator 104 may determine that the user response is negative in response to determining that the facial expression 144, the verbal expression 164, or both, indicate that the user response is negative. As a further example, the advertisement generator 104 may determine that the user response is neutral in response to determining that the facial expression 144, the verbal expression 164, or both, indicate that the user response is neutral.

In a particular embodiment, the advertisement generator 104 may determine that the user response is negative in response to determining that at least one of the facial expression 144 or the verbal expression 164 indicates that the user response is negative. The advertisement generator 104 may determine that the user response is neutral in response to determining that the facial expression 144 and the verbal expression 164 both indicate that the user response is neutral. The advertisement generator 104 may determine that the user response is positive in response to determining that one of the facial expression 144 or the verbal expression 164 indicates that the user response is positive and that the other of the facial expression 144 or the verbal expression 164 indicates that the user response is positive or neutral.

The advertisement generator 104 may select a FG component based on the user response and on content of the first FG component 132. For example, the advertisement generator 104 may select the second FG component 134 in response to determining that the user response to the advertisement 150 is positive (or neutral) and that first FG component 132 and the second FG component 134 are associated with a common characteristic, as described with reference to FIG. 2. As another example, the advertisement generator 104 may select the third FG component 136 in response to determining that the user response to the advertisement 150 is negative (or neutral) and that the third FG component 134 has a particular characteristic that is distinct from the first characteristic of the first FG component 132, as described with reference to FIG. 3.

The advertisement generator 104 may generate an updated advertisement 152 by combining the first BG component 122 and the selected FG component (e.g., the second FG component 134 or the third FG component 136). In a particular embodiment, the updated advertisement 152 may include additional components (e.g., additional FG components). The advertisement generator 104 may select one or more of the additional components based on the user response. The advertisement generator 104 may send the updated advertisement 152, via the network 190, to the user equipment 180. The user equipment 180 may provide the updated advertisement 152 to the display 110. In a particular embodiment, the updated advertisement 152 may replace the advertisement 150 on the display 110. That is, the advertisement 150 may be replaced by the updated advertisement 152 responsive to the user response to the advertisement 150. The advertisement generator 104 may generate the advertisement 150, the updated advertisement 152 or both, when a particular application is started on a particular device (e.g., the user equipment 180 user device or the device 102), when the particular device is active, when an image (e.g., the first image 154, the second image 156, or both) of a user is captured (or received), or a combination thereof.

Thus, the system 100 may enable generation of advertisements that are targeted to an individual user. For example, a background of an advertisement may be selected based on an image of the user corresponding to a particular location depicted in the background. The user may be receptive to the advertisement because the advertised items are displayed in a particular location that is similar to locations frequented by the user. As another example, an advertisement may be updated based on a user response to the advertisement. The user response may be determined based on a facial expression or a verbal expression of the user. The user may be more receptive to the updated advertisement because the updated advertisement may include (or exclude) a characteristic to which the user has previously responded positively (or negatively).

Figure 2:
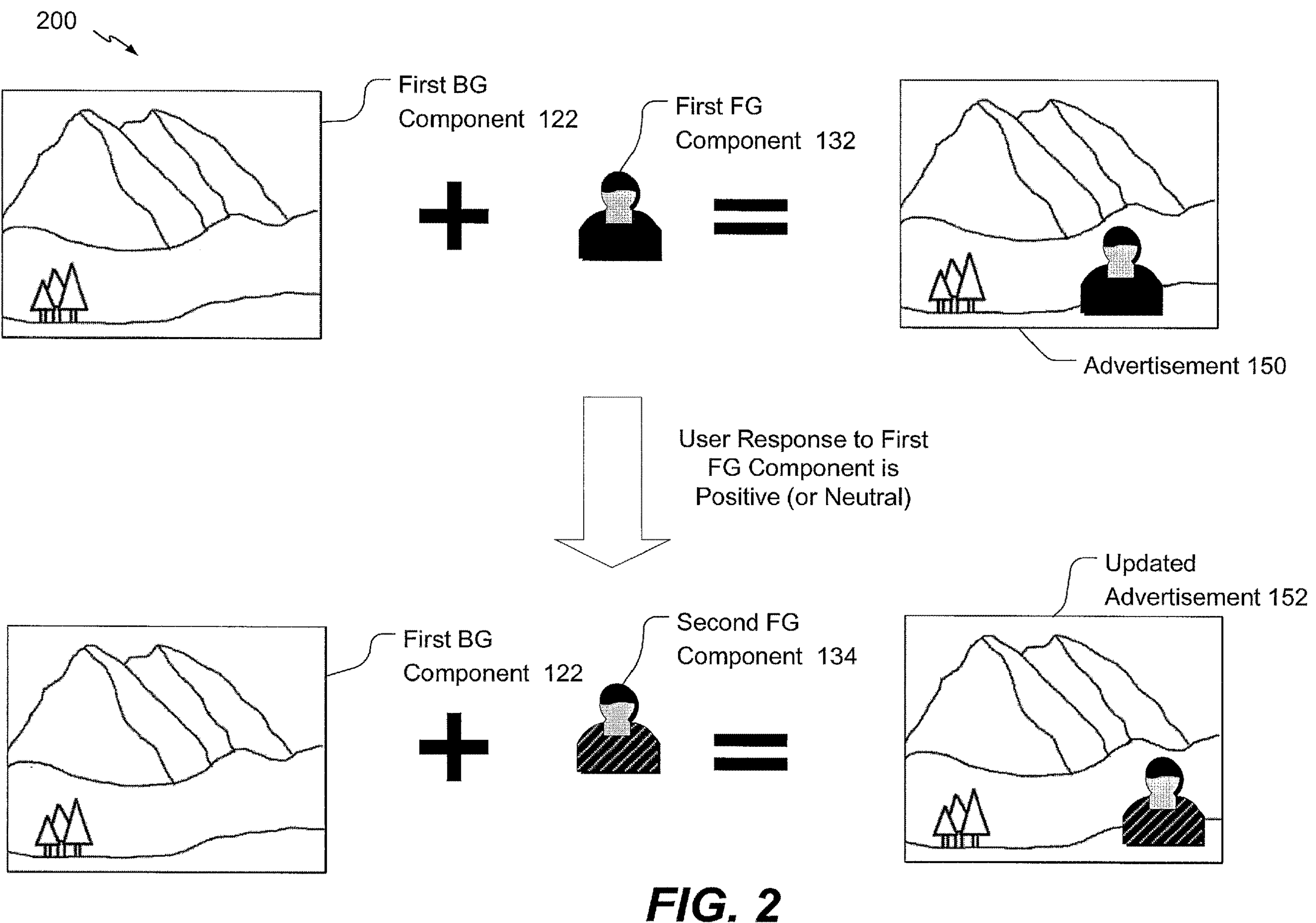
FIG. 2 is a diagram of an illustrative example of a method of operation of the system of FIG. 1.

Referring to FIG. 2, an illustrative example of a method is disclosed and generally designated 200. The method 200 may be performed by the advertisement generator 104, the device 102, the user equipment 180 of FIG. 1, or a combination thereof. The method 200 illustrates forming the advertisement 150 by combining the first BG component 122 and the first FG component 132 and generating the updated advertisement 152 by combining the first BG component 122 and the second FG component 134.

The first BG component 122 may correspond to a particular location (e.g., a hiking trail). The advertisement generator 104 may select the first BG component 122 based on an image of a user (e.g., the first image 154), as described with reference to FIG. 1. The advertisement generator 104 may combine the first BG component 122 with the first FG component 132 to generate the advertisement 150, as described with reference to FIG. 1. The advertisement generator 104 may provide the advertisement 150 to the display 110. The advertisement generator 104 may receive the second image 156, the audio data 158, or both, indicating a user response to the advertisement 150, as described with reference to FIG. 1. The advertisement generator 104 may determine the user response based on the second image 156, the audio data 158, or both, as described with reference to FIG. 1.

The advertisement generator 104 may select the second FG component 134 in response to determining that the user response to the advertisement 150 (and the first FG component 132) is positive (or neutral), as described with reference to FIG. 1. The first FG component and the second FG component 134 may share a common characteristic (e.g., a black shirt). The advertisement generator 104 may generate the updated advertisement 152 by combining that first BG component 122 and the second FG component 134. The advertisement generator 104 may provide the updated advertisement 152 to the display 110, as described with reference to FIG. 1. In a particular embodiment, the updated advertisement 152 may replace the advertisement 150 on the display 110. In an alternate embodiment, the updated advertisement 152 may be provided to the display 110 at a later time.

The method 200 may enable an updated advertisement to be dynamically generated based on a user response to a previous advertisement. The updated advertisement may include a characteristic (e.g., a shirt having a black color) to which a user has previously responded positively (or neutrally). The updated advertisement may thus be targeted to the individual user.

Figure 3:
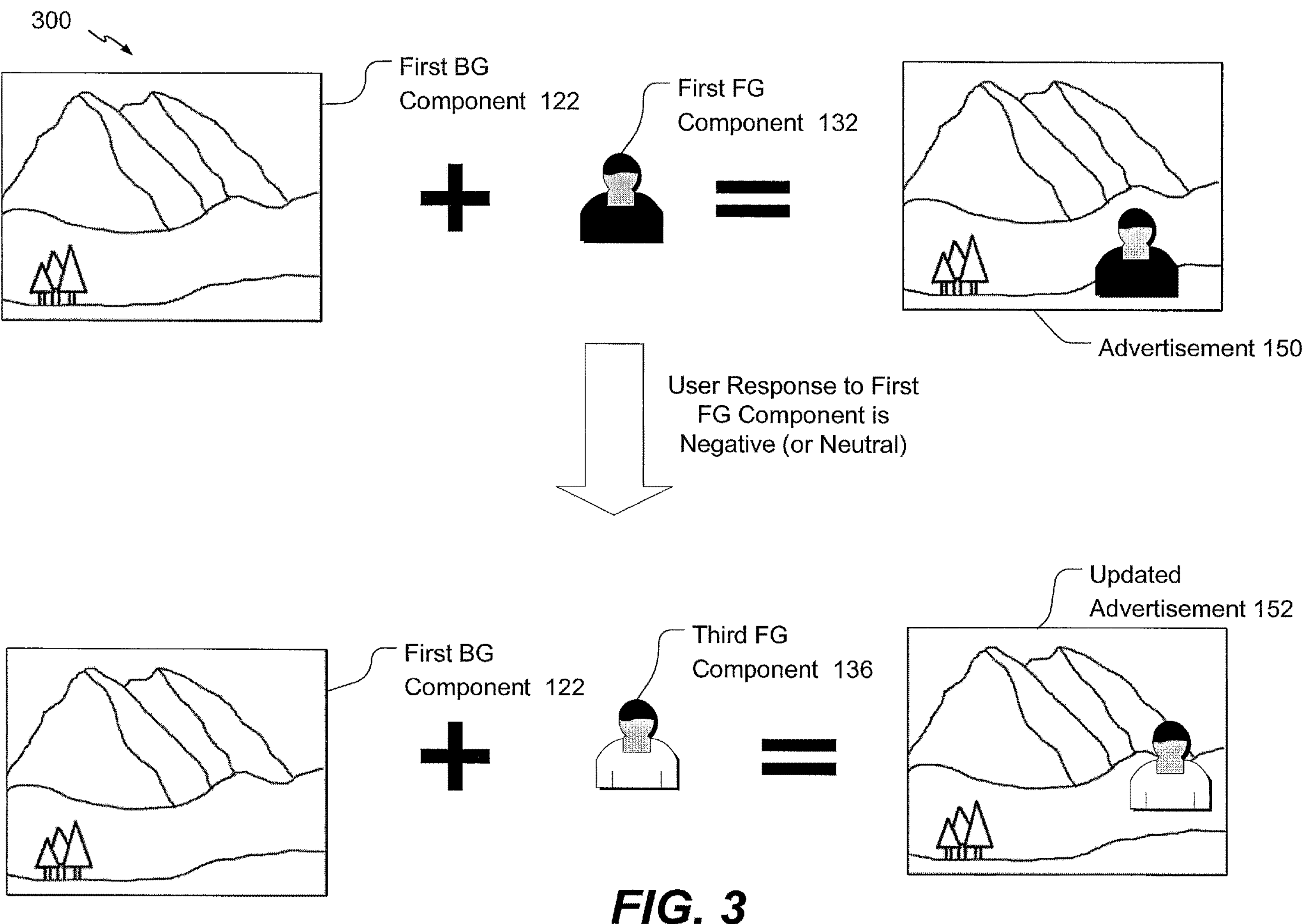
FIG. 3 is a diagram of another example of a method of operation of the system of FIG. 1.

Referring to FIG. 3, an illustrative example of a method is disclosed and generally designated 300. The method 300 may be performed by the advertisement generator 104, the device 102, the user equipment 180 of FIG. 1, or a combination thereof. The method 300 illustrates forming the advertisement 150 by combining the first BG component 122 and the first FG component 132 and generating the updated advertisement 152 by combining the first BG component 122 and the third FG component 136.

The method 300 differs from the method 200 of FIG. 2 in that the advertisement generator 104 determines that a user response to the advertisement 150 is negative (or neutral), as described with reference to FIG. 1. The first FG component may have a first characteristic (e.g., a black shirt) and the third FG component 136 may have a second characteristic (e.g., a white shirt) that is distinct from the first characteristic. The advertisement generator 104 may select the third FG component 136 in response to determining that the user response to the advertisement 150 (and the first FG component 132) is negative (or neutral), as described with reference to FIG. 1.

The method 300 may enable an updated advertisement to be dynamically generated based on a user response to a previous advertisement. The updated advertisement may exclude a characteristic (e.g., a shirt having a black color) to which a user has previously responded negatively (or neutrally). The updated advertisement may thus be targeted to the individual user.

Figure 4:
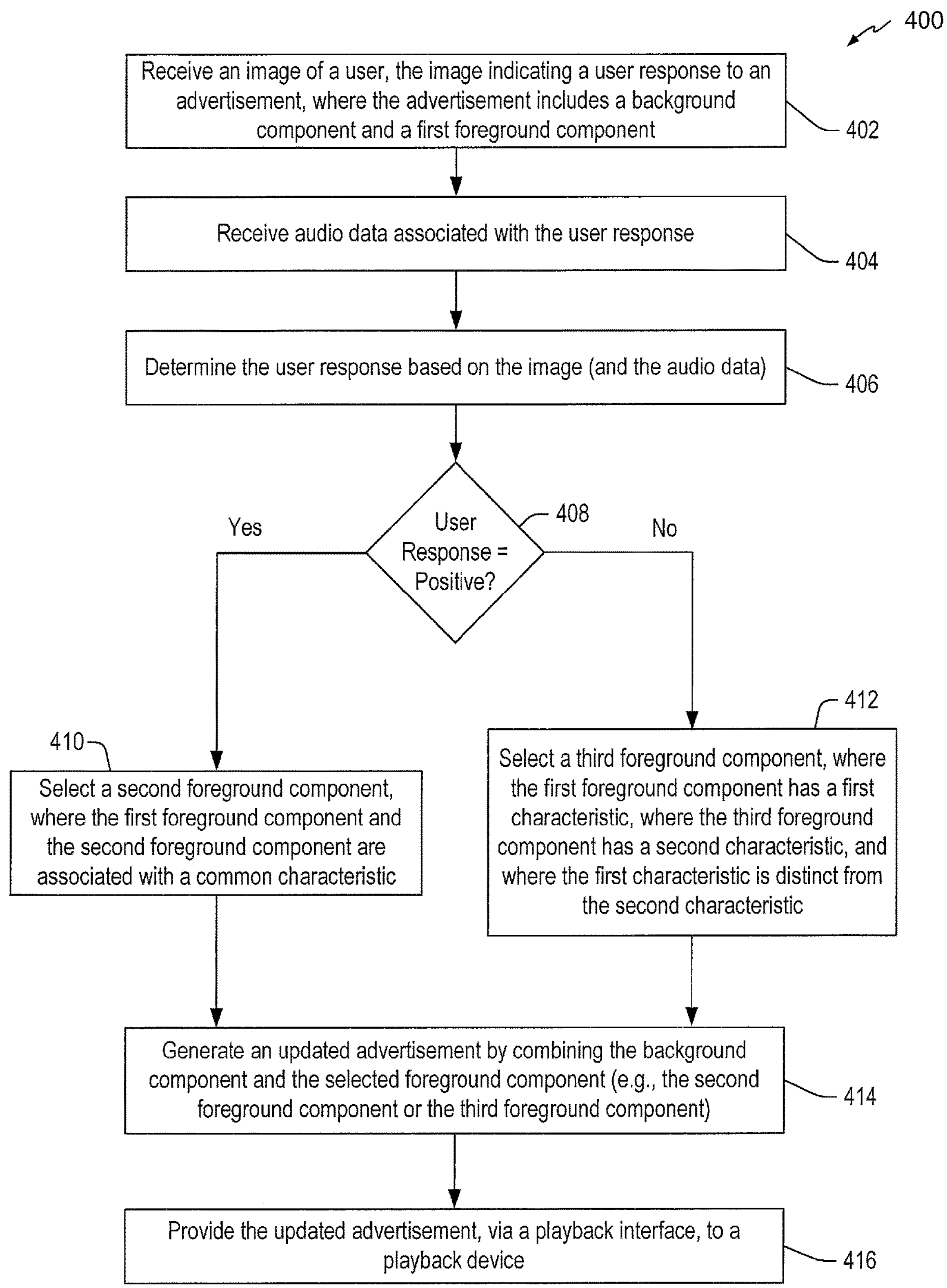
FIG. 4 is a flowchart to illustrate a particular embodiment of a method of generating an advertisement based on a user image.

FIG. 4 is a flowchart to illustrate a particular embodiment of a method 400 of generating an advertisement based on a user image. In an illustrative embodiment, the method 400 may be performed by the advertisement generator 104, the device 102, the user equipment 180 of FIG. 1, or a combination thereof.

The method 400 includes receiving an image of a user, at 402. For example, the advertisement generator 104 of FIG. 1 may receive the second image 156 of the user 116, as described with reference to FIG. 1. The second image 156 may indicate a user response to the advertisement 150 of FIG. 1. The advertisement 150 may include the first BG component 122 and the first FG component 132.

The method 400 also includes receiving audio data associated with the user response, at 404. For example, the advertisement generator 104 of FIG. 1 may receive the audio data 158 associated with the user response, as described with reference to FIG. 1.

The method 400 further includes determining the user response based on the image (and the audio data), at 406. For example, the advertisement generator 104 of FIG. 1 may determine the user response based on the second image 156, the audio data 158, or both, as described with reference to FIG. 1.

The method 400 also includes determining whether the user response is positive, at 408. For example, the advertisement generator 104 of FIG. 1 may determine whether the user response is positive based on the second image 156, the audio data 158, or both, as described with reference to FIG. 1.

The method 400 further includes, in response to determining that the user response is positive, at 408, selecting a second foreground component, at 410. For example, the advertisement generator 104 of FIG. 1 may select the second FG component 134 in response to determining that the user response is positive, as described with reference to FIGS. 1-2. The first FG component 132 and the second FG component 134 may be associated with a common characteristic (e.g., a shirt that is black).

The method 400 further includes, in response to determining that the user response is not positive, at 408, selecting a second foreground component, at 410. For example, the advertisement generator 104 of FIG. 1 may select the third FG component 136 in response to determining that the user response is not positive, as described with reference to FIGS. 1 and 3. The first FG component 132 may have a first characteristic (e.g., a shirt that is black). The third FG component 136 may have a second characteristic (e.g., a shirt that is white). The second characteristic may be distinct from the first characteristic.

The method 400 also includes generating an updated advertisement by combining the background component and the second foreground component, at 414. For example, the advertisement generator 104 of FIG. 1 may generate the updated advertisement 152 by combining the first BG component 122 and the selected FG component (e.g., the second FG component 134 or the third FG component 136), as described with reference to FIG. 1.

The method 400 further includes providing the updated advertisement, via a display interface, to a display device, at 416. For example, the advertisement generator 104 of FIG. 1 may provide the updated advertisement 152, via an interface (e.g., a network interface or a display interface), to the display 110.

The method 400 may enable an advertisement to be updated based on a user response to the advertisement. The updated advertisement may include (or exclude) a characteristic to which a user has previously responded positively (or negatively). The updated advertisement may thus be targeted to the individual user. The method 400 may be performed when a particular application is started on a particular device (e.g., a user device or an advertisement server), when the particular device is active, when an image of a user is captured (or received), or a combination thereof.

Figure 5:
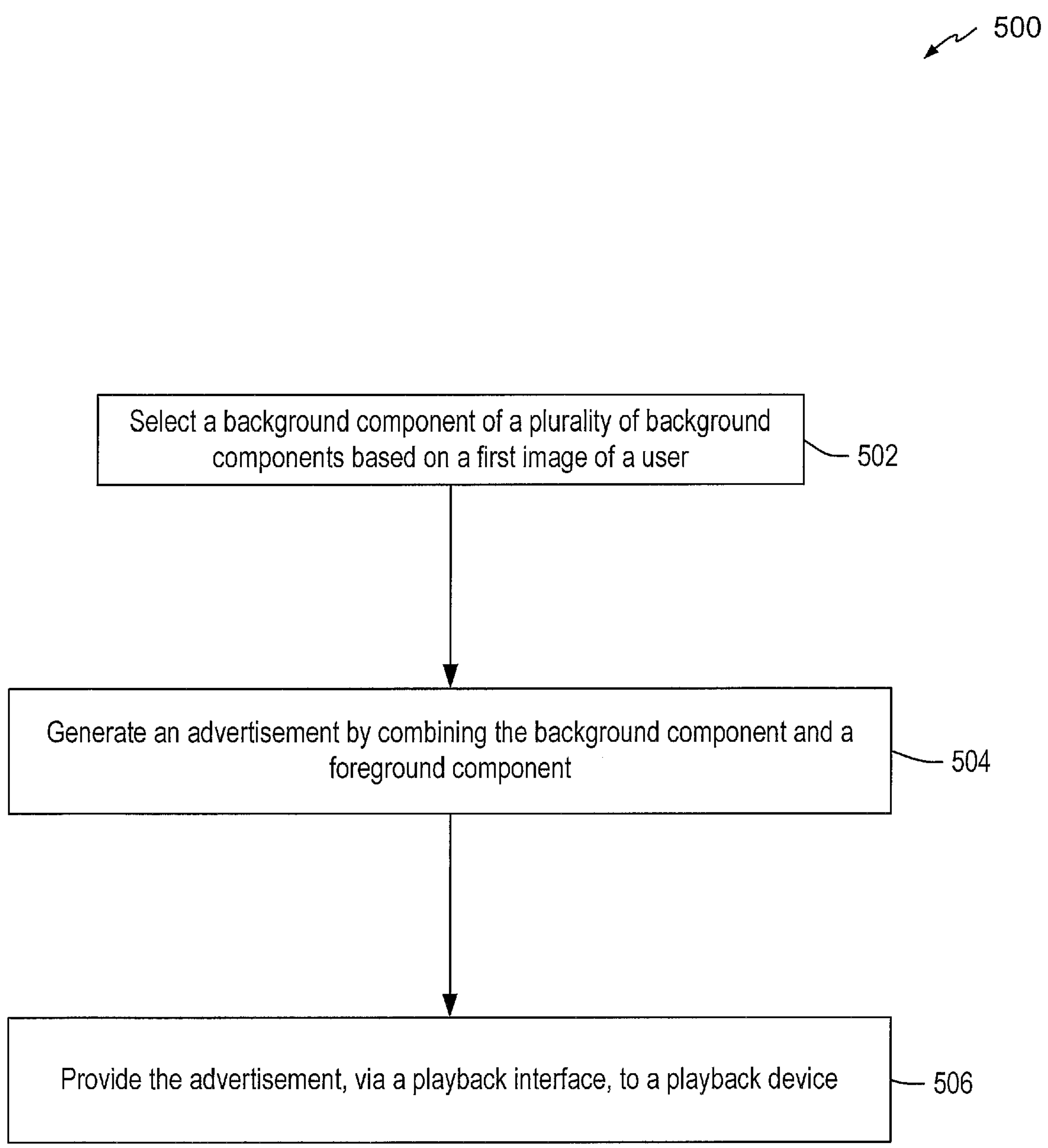
FIG. 5 is a flowchart to illustrate another particular embodiment of a method of generating an advertisement based on a user image.

FIG. 5 is a flowchart to illustrate a particular embodiment of a method 500 of generating an advertisement based on a user image. In an illustrative embodiment, the method 500 may be performed by the advertisement generator 104, the device 102, the user equipment 180 of FIG. 1, or a combination thereof.

The method 500 includes selecting a background component of a plurality of background components based on a first image of a user, at 502. For example, the advertisement generator 104 of FIG. 1 may select the first BG component 122 of the BG components 120 based on the first image 154 of the user 116, as described with reference to FIG. 1. The first BG component 122 may depict a first location that corresponds to the first image 154. For example, the first location may correspond to a type of clothing item (e.g., a track suit), a type of accessory (e.g., running shoes), or both, represented in the first image 154, as described with reference to FIG. 1.

The method 500 also includes generating an advertisement by combining the background component and a foreground component, at 504. For example, the advertisement generator 104 of FIG. 1 may generate the advertisement 150 by combining the first BG component 122 and the first FG component 132, as described with reference to FIG. 1. The first FG component 132 may represent an item (e.g., a clothing item, an accessory, or both) to be advertised.

The method 500 further includes providing the advertisement, via a display interface, to a display device, at 506. For example, the advertisement generator 104 of FIG. 1 may provide the advertisement 150, via an interface (e.g., a network interface or a display interface), to the display 110.

The method 500 may enable generation of advertisements that are targeted to an individual user. A background of an advertisement may be selected based on an image of the user. For example, the image of the user may correspond to a particular location that is depicted in the background. The user may be receptive to the advertisement because advertised items are displayed in the particular location that is similar to a location recently frequented by the user or about to be frequented by the user. For example, the image of the user may indicate that the user is wearing a track suit. The user may have recently been outdoors, may be outdoors, or may be going outdoors.

Figure 6:
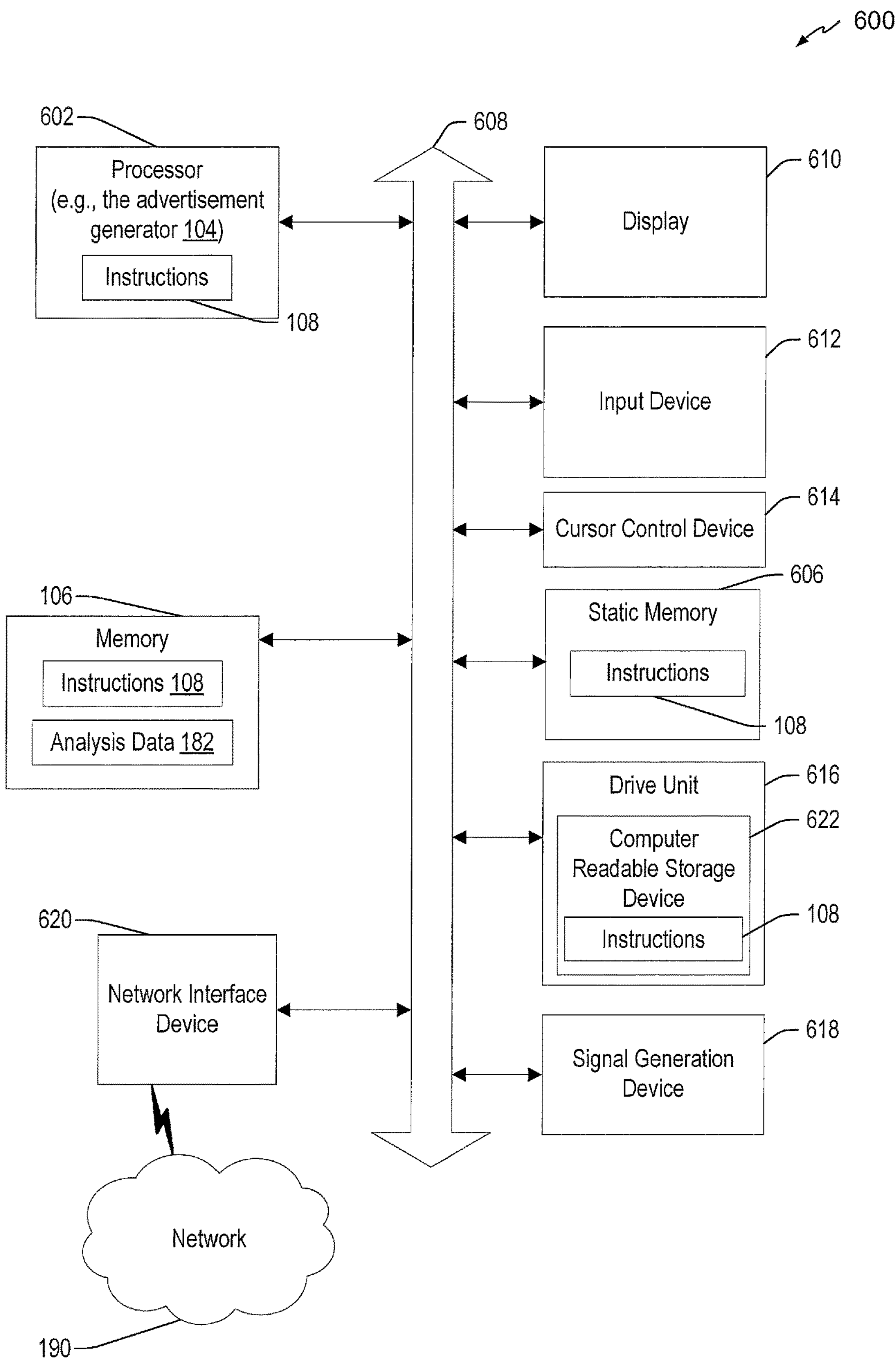
FIG. 6 is a block diagram of an illustrative embodiment of a general computer system operable to support embodiments of computer-implemented methods, computer program products, and system components as illustrated in FIGS. 1-5.

FIG. 6 is a block diagram illustrating an embodiment of a general computer system that is generally designated 600. The computer system 600 may be operable to support embodiments of computer-implemented methods, computer program products, and system components as illustrated in FIGS. 1-5. In a particular embodiment, the computer system 600 may correspond to the device 102, the user equipment 180 of FIG. 1, or both. The computer system 600 may be coupled to, or in communication with, other computer systems or peripheral devices.

The computer system 600 may be implemented as or incorporated into various devices, such as a tablet computer, a personal digital assistant (PDA), a palmtop computer, a laptop computer, a smart phone, a communications device, a web appliance, a display device, a computing device, or any other machine capable of executing a set of instructions (sequential or otherwise) that specify actions to be taken by that machine. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU). In a particular embodiment, the processor 602 may correspond to the advertisement generator 104 of FIG. 1. In a particular embodiment, the processor 602 may include multiple processors. For example, the processor 602 may include distributed processors, parallel processors, or both. The multiple processors may be included in, or coupled to, a single device or multiple devices. The processor 602 may include a virtual processor. In a particular embodiment, the processor 602 may include a state machine, an application specific integrated circuit (ASIC), or a programmable gate array (PGA) (e.g., a field PGA).

Moreover, the computer system 600 may include a main memory (e.g., the memory 106 of FIG. 1) and a static memory 606 that may communicate with each other via a bus 608. The main memory 604, the static memory 606, or both, may include the instructions 108 of FIG. 1. As shown, the computer system 600 may further include or be coupled to a display unit 610, such as a liquid crystal display (LCD), an organic light emitting diode (OLED), a flat panel display, a solid-state display, or a projection display. In a particular embodiment, the display unit 610 may correspond to the display 110 of FIG. 1. Additionally, the computer system 600 may include an input device 612, such as a keyboard, a remote control device, the camera 112, the microphone 114 of FIG, and a cursor control device 614, such as a mouse. In a particular embodiment, the cursor control device 614 may be incorporated into the remote control device. The computer system 600 may also include a disk drive unit 616, a signal generation device 618, such as a speaker, and a network interface device 620. The network interface device 620 may be coupled to other devices (not shown) via a network 190. For example, the network interface device 620 may be coupled to the device 102, the user equipment 180 of FIG. 1, or both. In a particular embodiment, one or more of the components of the computer system 600 may correspond to, or be included in, the device 102, the user equipment 180 of FIG. 1, or both.

In a particular embodiment, as depicted in FIG. 6, the disk drive unit 616 may include a tangible computer-readable storage device 622 in which one or more sets of instructions 108, e.g. software, may be embedded. Further, the instructions 108 may embody one or more of the methods or logic as described herein. In a particular embodiment, the instructions 108 may reside completely, or at least partially, within the memory 106, the static memory 606, and/or within the processor 602 during execution by the computer system 600. The processor 602 may execute the instructions 108 to perform operations corresponding to one or more of the methods or logic as described herein. The processor 602 may perform the operations directly, or the processor 602 may facilitate, direct, or cooperate with another device or component to perform the operations.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable storage device that includes instructions 108 to enable advertisement generation based on a user image. Further, the instructions 108 may be transmitted or received over the network 190 via the network interface device 620 (e.g., via uploading and/or downloading of an advertisement generation application or program, or both).

While the computer-readable storage device is shown to be a single device, the term "computer-readable storage device" includes a single device or multiple devices, such as centralized or distributed storage, and/or associated caches that store one or more sets of instructions. The term "computer-readable storage device" shall also include any device that is capable of storing a set of instructions for execution by a processor or that causes a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magnetooptical or optical medium, such as a disk or tapes. A computer-readable storage device is an article of manufacture and is not a signal.

It should also be noted that software that implements the disclosed methods may be stored on a storage device, such as: a disk or tape; a magneto-optical or optical device, such as a disk; or a solid state device, such as a memory card or other package that houses one or more read-only (non-volatile) memories, random access memories, or other re-writable (volatile) memories.

Although the present specification describes components and functions that may be implemented in particular embodiments with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions.

Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

performing, by a processing system including a processor, facial recognition on first image data associated with user equipment to determine an identity of a viewer;

accessing, by the processing system, user data associated with the identity of the viewer;

selecting, by the processing system, a first foreground component based on a purchasing history of the viewer, wherein the purchasing history is included in the user data associated with the identity of the viewer; and providing, by the processing system, multimedia content to the user equipment for presentation to the viewer, wherein the multimedia content includes the first foreground component and a background component associated with a first item represented in the first image data.

2. The method of claim 1, wherein the first image data is further associated with an image of the viewer that includes a response of the viewer to an output of the user equipment.

3. The method of claim 1, further comprising selecting, by the processing system, the background component included in the multimedia content according to a characteristic of the first item represented in the first image data.

4. The method of claim 3, further comprising analyzing, by the processing system, the first image data, to identify the first item represented in the first image data.

5. The method of claim 1, wherein the selecting, by the processing system, the first foreground component is further based on user preferences, content history, user demographics, or a combination thereof, associated with the viewer.

6. The method of claim 1, further comprising receiving, by the processing system, response data indicating a reaction of the viewer to the multimedia content.

7. The method of claim 6, wherein the response data includes second image data associated with the viewer, and further comprising determining, by the processing system, the reaction based on a facial expression of the viewer in the second image data.

8. The method of claim 6, wherein the response data includes audio data, and further comprising:

determining, by the processing system, the reaction from the audio data;

determining, by the processing system, a verbal expression from the audio data via speech recognition; and determining, by the processing system, that the reaction is a positive reaction responsive to the verbal expression being a positive verbal expression.

9. The method of claim 6, further comprising:

determining, by the processing system, a second foreground component based on the reaction of the viewer;

generating, by the processing system, updated multimedia content by combining the background component and the second foreground component; and providing, by the processing system, the updated multimedia content to the user equipment.

10. The method of claim 9, wherein the second foreground component includes the first characteristic responsive to the reaction of the viewer being a positive reaction.

11. The method of claim 9, wherein the second foreground component includes a second characteristic distinct from the first characteristic responsive to the reaction of the viewer being a negative reaction.

12. A device comprising a processing system including a processor; and a memory coupled to the processing system, wherein the memory stores instructions executable by the processing system to perform operations, the operations including:

performing facial recognition on first image data associated with user equipment to determine an identity of a viewer;

accessing user data associated with the identity of the viewer;

selecting a first foreground component based on a purchasing history of the viewer, wherein the purchasing history is included in the user data associated with the identity of the viewer; and providing multimedia content to the user equipment for presentation to the viewer, wherein the multimedia content includes the first foreground component and a background component associated with a first object represented in the first image data.

13. The device of claim 12, wherein the operations further comprise selecting the background component included in the multimedia content according to a characteristic of the first object represented in the first image data.

14. The device of claim 13, wherein the operations further comprise analyzing, by the processing system, the first image data, to identify the first object represented in the first image data.

15. The device of claim 12, wherein the operations further comprise receiving response data indicating a reaction of the viewer to the multimedia content.

16. The device of claim 15, wherein the response data includes second image data associated with the viewer, and further comprising determining the reaction based on a facial expression of the viewer in the second image data.

17. The device of claim 15, wherein the operations further comprise:

determining a second foreground component based on the reaction of the viewer;

generating updated multimedia content by combining the background component and the second foreground component; and providing the updated multimedia content to the user equipment.

18. A computer-readable storage device storing instructions that, when executed by a processing system including a processor, cause the processing system to perform operations, the operation comprising:

transmitting, to a media processing device, first image data associated with a viewer;

receiving multimedia content from the media processing device responsive to the transmitting the first image data, wherein the multimedia content includes a first foreground component and a background component associated with a first item represented in the first image data, wherein the media processing device selects the first foreground component based on a purchasing history of the viewer included in user data associated with an identity of the viewer, and wherein the media processing device performs facial recognition on the first image data to determine the identity of the viewer; and presenting the multimedia content to the viewer.

19. The computer-readable storage device of claim 18, wherein the media processing device selects the background component included in the multimedia content according to a characteristic of the first item represented in the first image data.

20. The computer-readable storage device of claim 18, wherein the operations further comprise capturing the first image data.

* * * * *